3,836,586
PROCESS FOR PRODUCING ACROLEIN
OR METHACROLEIN
Keisho Yamada, Sumio Umemura, Kyoji Ohdan, and Kazuo Fukuda, Ube, Japan, assignors to Ube Industries, Ltd., Ube, Yamaguchi-ken, Japan
No Drawing. Filed Dec. 1, 1970, Ser. No. 94,215
Claims priority, application Japan, June 12, 1970, 45/50,209
Int. Cl. C07c 45/02
U.S. Cl. 260—604 R      4 Claims

ABSTRACT OF THE DISCLOSURE

A process for the production of acrolein or methacrolein in which propylene or isobutylene is contacted with oxygen or oxygen-containing gas in a vapor phase in the presence of a specified catalyst. The catalyst comprises (a) bismuth antimonate and (b) at least one molybdic acid salt of the following metals; manganese, iron, and cobalt.

---

The invention relates to a process for producing acrolein or methacrolein from propylene or isobutylene. More particularly, it relates to a process for producing acrolein or methacrolein with high selectivity comprising contacting propylene or isobutylene with oxygen or oxygen-containing gas in a vapor phase in the presence of a novel catalyst.

Various oxidation catalysts have been heretofore proposed for use in a vapor phase catalytic oxidation of olefinically unsaturated hydrocarbons to produce corresponding unsaturated aldehydes with a view of enhancing selectivity of desired unsaturated hydrocarbon without reducing conversion of olefin raw material. The known oxidation catalysts include, for example, cuprous oxide, cupric oxide, bismuth molybdate or bismuth phosphomolybdate, cobalt molybdate, antimony oxide, bismuth oxide, vanadium oxide and the like.

However, when propylene or isobutylene is catalytically oxidized into acrolein or methacrolein in a vapor phase in the presence of the known catalysts, substantial amounts of by-products are inevitably formed such as carbon dioxide, carbon monoxide, saturated aldehydes, e.g. formaldehyde, acetaldehyde and acids, e.g. acetic acid and acrylic acid, resulting in the reduction of selectivity for desired acrolein or methacrolein. Furthermore, expensive operations are required in order to remove such by-products and to obtain a highly purified product.

An object of the present invention is to provide a process of the vapor phase catalytic oxidation of propylene or isobutylene into acrolein or methacrolein with high yield, i.e. considerable reduction of such side reactions as described above.

Another object of the present invention is to provide a catalysts with high selectivity for the vapor phase oxidation of propylene or isobutylene into acrolein or methacrolein.

Other objects and advantages will become apparent from the following description.

According to the present invention, a process for the production of acrolein or methacrolein which comprises contacting propylene or isobutylene in a vapor phase with oxygen or an oxygen-containing gas in the presence of a catalyst comprising (a) bismuth antimonate and (b) at least one member selected from the molybdic acid salts of metals consisting of manganese, iron, and cobalt, is provided.

Propylene or isobutylene which is oxidized by a process of the invention is not necessarily highly purified, but a mixture of propylene and propane or a mixture of isobutylene and butane may also be used. However, any gas substantially exhibiting activity under the particular reaction conditions, for example, acetylene, n-butylene and the like, should preferably be excluded from a feed mixture since they may form undesirable by-products.

As a source of oxygen which is used in the catalytic oxidation of the invention, pure oxygen and any oxygen-containing gas may be used. Particularly, air may be advantageously used. A relative proportion of oxygen in a feed mixture is suitably from 0.8 to 3 moles, and preferably from about 1.0 to about 2.5 moles per mole of propylene or isobutylene. Feeding of oxygen in excess of the above limit inevitably leads to formation of side-products such as carbon monoxide and carbon dioxide. On the contrary, feeding of oxygen less than the above range brings about a reduction of selectivity of the desired product.

Furthermore, diluent gas may be used in addition to propylene or isobutylene and oxygen. As diluent gas, the one which does not exert any substantial activity on the reaction, such as steam, nitrogen, carbon dioxide, ethane, propane, butane, isobutane and the like may be used. A relative proportion of diluent gas in a feed mixture is preferably more than 0.5 moles per mole of propylene or isobutylene. Steam in the reaction mixture not only acts as a diluent but also exhibit effects to enhance the selectivity of the catalyst for the formation of acrolein or methacrolein and to make the activity of the catalyst durable. Accordingly, it is generally preferred to add at least an equi-molar amount of steam to a feed mixture based on the olefin in the feed mixture.

The catalyst composition, which is used in the present invention, comprises the following two components; (a) bismuth antimonate and (b) at least one member selected from the molybdic acid salts of metals consisting of manganese, iron and cobalt.

As bismuth antimonate, as used herein refers to the various compounds expressed by the formulae; for example, $BiSbO_4$, $Bi(SbO_3)_3$ and $(BiO)_3SbO_4$. Bismuth antimonate, wherein atomic ratio of antimony and bismuth is 1:1, i.e. expressed by the formula $BiSbO_4$, is the most preferably. Molybdic acid salt of the particular metals specified also includes various compounds. Metal molybdates, which are most preferably employed in a process of the invention, are those expressed by the formulae: $MnMoO_4$, $Fe_2(MoO_4)_3$, and $CoMo_3O_{10}$.

As an antimony source, which is used as starting raw material for preparing bismuth antimonate of the present invention, antimony chloride, antimony oxide, antimony hydroxide, antimony oxychloride and the like are, for example, enumerated. As a bismuth source, bismuth nitrate, bismuth chloride, bismuth carbonate, bismuth sulfate, bismuth oxide; bismuth oxychloride, bismuth hydroxide and the like are, for example, enumerated. In the preparation of bismuth antimonate, the above starting raw material may be used in the form of a solution in a suitable solvent, e.g. water, inorganic acid such as nitric acid and hydrochloric acid, and organic acid.

On the other hand, as a molybdenum source, which is used as starting raw material for preparing the molybdate of manganese, iron and cobalt, molybdic acid, ammonium molybdate, sodium molybdate, potassium holybdate and the like, are, for example, enumerated. As a manganese, iron or cobalt source, nitrate, chloride, carbonate, sulfate, oxide, hydroxide, acetate and the like of the respective metals are, for example, enumerated. In the preparation of molybdate, the above starting raw material may also be used in the form of a solution in a suitable solvent, e.g. water, inorganic acid such as nitric acid and hydrochloric acid, organic acid and aqueous ammonia.

A ratio of (a) bismuth antimonate to (b) metal molybdate in a catalyst is preferably from 95:5 to 20:80 ((a):(b), by weight) and most preferably from 90:10 to 30:70. When a ratio of both components (a) and (b) is outside the above range, side-reactions occur and accordingly, the selectivity of the desired acrolein or methacrolein is somewhat reduced.

Preferred methods for preparing some of the catalyst components will be described for illustrative purposes:

(a) Bismuth antimonate

Antimony trichloride is dissolved in a concentrated hydrochloric acid and water is added thereto to hydrolyze the salt and to form precipitates. To the mixture, aqueous ammonia is added to provide antimony oxide, to which a solution of bismuth nitrate in a diluted nitric acid is added. The resulting mixture is heated to dryness until the evolution of nitrogen dioxide has ceased and the solid is calcined to produce bismuth antimonate. By varying an atomic ratio of antimony and bismuth employed, various compounds expressed by the formulae: $BiSbO_4$, $Bi(SbO_3)_3$ and $(BiO)_3SbO_4$ will be produced. Bismuth antimonate ($BiSbO_4$) which is preferably employed in the process of the invention can be obtained by reacting both components in equi atomic ratio. However, a minor amount for instance, up to about 10% by weight based on $BiSbO_4$ of $Bi(SbO_3)_3$ and/or $(BiO)_3SbO_4$ may be present in the bismuth antimonate to be used in a process of the invention.

(b) Molybdic acid metal salt

A solution of nitric acid salt of the corresponding metal is added to a solution of ammonium molybdate. The resultant mixture is heated to dryness until the evolution of nitrogen dioxide has ceased, and the solid is calcined to produce the corresponding metal salt of molybdic acid. By varying an atomic ratio of molybdenum and the particular metal, various compounds will be usually produced. Metal molybdates which are suitably employed in a process of the invention, i.e. those expressed by the formulae: $MnMoO_4$, $Fe_2(MoO_4)_3$, and $CoMo_3O_{10}$ can be obtained by reacting both components in such a proportion wherein an atomic ratio of molybdenum to the particular metal corresponds to the atomic ratio of both metals in the desired molybdate as listed above. However, minor amounts for instance, up to about 20% by weight based on $MnMoO_4$, $Fe_2(MoO_4)_3$, or $CoMo_3O_{10}$, of metal molybdate, which can be obtained by reacting both components in such a proportion other than the above, i.e. those expressed by the formulae: for example, $FeMoO_4$ and $CoMoO_4$, may also be present in the metal molybdate to be suitably used in a process of the invention.

The catalyst may be used alone or in combination with any of the known carriers. As carriers, those which bring favorable effects for the reaction involved, such as silica, alumina, alumina-silica, silicate and the like which have been deactivated by, e.g. heat-treatment, may suitably be employed. These carriers may be used for example from 10 to 90% by weight of the catalyst.

The catalyst may be employed in either a fluidized bed or a fixed bed, although it is more advantageously used in a fixed bed since the life is extremely long.

Size and configuration of the catalyst grain are not critical but depend primarily on whether the catalyst is used in a fluidized bed or fixed bed. The catalyst may also be shaped or grained by suitable known methods in order to provide required mechanical strength.

The reaction is usually carried out under atmospheric pressure although slightly superatmospheric or slightly reduced pressures may be used if desired.

The reaction is suitably carried out at a temperature ranging between 300° C. and 600° C., preferably between 350° C. and 500° C. Reaction temperatures exceeding the above range cause the decomposition of propylene or isobutylene, the reduction of selectivity and the promotion of side-reactions.

A contact time of 0.5 to 40 seconds, especially 1 to 20 seconds, is preferred.

The invention will be further illustrated with reference to examples, in which "% selectivity" and "% conversion" are defined as follows:

Percent selectivity
$$= \frac{\text{moles of the olefin converted from moles of the product}}{\text{moles of the olefin consumed}} \times 100$$

Percent conversion $= \frac{\text{moles of the olefin consumed}}{\text{moles of the olefin supplied}} \times 100$ and "%" is percent by weight unless otherwise specified. Selectivity and conversion of the main products, i.e. acrolein or methacrolein and acetaldehyde are shown in the examples, but those of the by-products, such as other aldehydes and acids, are omitted because of being negligible.

Example 1

116 g. of antimony trichloride ($SbCl_3$) was dissolved in 12 cc. of concentrated hydrochloric acid. To the solution, water was added leading to hydrolysis and to prepare a precipitate and then 76.7 cc. of aqueous ammonia were added to form antimony oxide. The reaction mixture was filtered and washed with water. The resultant product was placed in an evaporating dish and a solution of 246 g. of bismuth nitrate [$Bi(NO_3)_3 \cdot 5H_2O$] dissolved in a solution of 46 cc. of 62% nitric acid in 46 cc. of water was added thereto and then, the mixture was heated to dryness. The heating was continued until the evolution of nitrogen dioxide had completely ceased. The solid was packed into a U-shaped stainless steel pipe and calcined at 700° C. for 16 hours by heating from outside while passing air through the pipe at a flow rate of 100 cc./min. Thus, bismuth antimonate ($BiSbO_4$) was obtained.

A solution of 58.8 g. of ammonium molybdate $$[(NH_4)_6Mo_7O_{24} \cdot 4H_2O]$$

in 177 cc. of water was heated to a temperature of 80 to 90° C. To the solution, a solution of 95.4 g. of manganese nitrate [$Mn(NO_3)_2 \cdot 6H_2O$] in 100 cc. of water was added. The resultant mixture was placed in an evaporation dish and heated to dryness until nitrogen dioxide and ammonium nitrate had ceased to evolve. The resultant solid was placed in a U-shaped stainless steel pipe, and calcined at 540° C. for 16 hours by heating from outside while passing air through the pipe at a flow rate of 100 cc./min. Thus, manganese molybdate ($MnMoO_4$) was obtained.

The bismuth antimonate and the manganese molybdate so prepared were mixed together in a weight ratio of 60:40, and were kneaded in a mortar together with water to provide a paste. The paste was dried at 130° C. for 16 hours and dressed to grain of 14 to 20 mesh (Tyler standard sieve), which was employed as a catalyst.

8 cc. of the catalyst was packed into a U-shaped stainless steel reaction tube having an inner diameter of 6 mm. A gaseous mixture of propylene, steam and air, a molar ratio of the three components being 1:2:5, respectively, was passed through the catalyst-packed reaction tube maintained at 470° C. at a flow rate of 120 cc./min. The contact time was 4.0 seconds.

Under these conditions, conversion of propylene was 43.2% and selectivities to acrolein and to acetaldehyde were 85.6% and 4.0%, respectively.

Examples 2–5

With four kinds of catalysts, each containing bismuth antimonate ($BiSbO_4$) and manganese molybdate ($MnMoO_4$) in varied mixing weight ratios, catalytic oxidation of propylene was carried out under the same conditions as those of Example 1. Results are shown in Table 1.

TABLE 1

| Example | Catalyst composition (percent) | | Conversion of propylene (percent) | Selectivity (percent) | |
|---|---|---|---|---|---|
| | BiSbO₄ | MnMoO₄ | | Acrolein | Acetaldehyde |
| 2 | 80 | 20 | 41.3 | 79.3 | 3.3 |
| 3 | 70 | 30 | 49.6 | 82.3 | 4.9 |
| 4 | 50 | 50 | 55.0 | 83.0 | 4.5 |
| 5 | 40 | 60 | 54.3 | 80.0 | 4.3 |

Example 6

The same process as that of Example 1 was repeated except for employing isobutylene as a starting raw material in place of propylene.

Conversion of isobutylene was 65.5% and selectivities of the reaction products were as follows:

| | Percent |
|---|---|
| Methacrolein | 83.6 |
| Acetaldehyde | 4.8 |

Examples 7-10

The same process as that of Example 1 was repeated except that manganese molybdate in the catalyst used in Example 1 was replaced with iron molybdate $$[Fe_2(MoO_4)_3].$$

Results are shown in Table 2.

The iron molybdate [Fe₂(MoO₄)₃] was prepared as follows:

A solution of 88.3 g. of ammonium molybdate $$[(NH_4)_6Mo_7O_{24}\cdot 4H_2O]$$

in 260 cc. of water was heated to a temperature of 80 to 90° C. To the solution, a solution of 135 g. of iron nitrate [Fe(NO₃)₃·9H₂O] in 135° cc. of water was added. The mixture was placed in an evaporation dish and heated to dryness until nitrogen dioxide and ammonium nitrate had ceased to evolve. The resultant solid was calcined under the similar conditions to those of the preparation of manganese molybdate in Example 1. Thus, bismuth antimonate-iron molybdate catalyst was prepared.

TABLE 2

| Example | Catalyst composition (percent) | | Conversion of propylene (percent) | Selectivity percent | |
|---|---|---|---|---|---|
| | BiSbO₄ | Fe₂(MoO₄)₃ | | Acrolein | Acetaldehyde |
| 7 | 80 | 20 | 30.4 | 85.8 | 4.1 |
| 8 | 70 | 30 | 35.0 | 84.6 | 4.5 |
| 9 | 60 | 40 | 37.3 | 83.2 | 5.0 |
| 10 | 50 | 50 | 39.6 | 80.0 | 6.1 |

Examples 11-15

The same process as that of Example 1 was repeated except that isobutylene was used as a starting raw material in place of propylene and that cobalt molybdate was used in place of manganese molybdate. Results are shown in Table 3.

The cobalt molybdate [CoMo₃O₁₀] was prepared as follows:

A solution of 88.3 g. of ammonium molybdate $$[(NH_4)_6Mo_7O_{20}\cdot 4H_2O]$$

in 260 cc. of water was heated at a temperature of 80 to 90° C. To the solution, a solution of 48.5 g. of cobalt nitrate [Co(NO₃)₂·6H₂O] in 50 cc. of water was added. The mixture was placed in an evaporation dish and heated to dryness until nitrogen dioxide and ammonium nitrate had ceased to evolve. The resultant solid was calcined under the similar conditions to those of the preparation of manganese molybdate in Example 1. Thus, bismuth antimonate-cobalt molybdate catalyst was prepared.

TABLE 3

| Example | Catalyst composition (percent) | | Conversion of isobutylene (percent) | Selectivity (percent) | |
|---|---|---|---|---|---|
| | BiSbO₄ | CoMo₃O₁₀ | | Methacrolein | Acetaldehyde |
| 11 | 90 | 10 | 38.1 | 70.7 | 4.5 |
| 12 | 80 | 20 | 40.4 | 80.1 | 3.6 |
| 13 | 70 | 30 | 42.0 | 82.3 | 3.6 |
| 14 | 60 | 40 | 45.1 | 79.6 | 4.6 |
| 15 | 50 | 50 | 47.1 | 79.0 | 5.3 |

Example 16

The same process as that of Example 13 was repeated except for using propylene as a starting material in place of isobutylene.

Conversion of propylene was 46.6% and selectivities to acrolein and acetaldehyde were 82.4% and 3.5%, respectively.

Example 17

8 cc. of the same catalyst as that of Example 13 were packed into a U-shaped stainless steel reaction tube having an inner diameter of 6 mm. A gaseous mixture of propylene, steam and air, a molar ratio of the three components being 1:2:5, respectively, was passed through the reaction tube maintained at 450° C. at a flow rate of 80 cc./min. The contact time was 6 seconds.

Thus, 48.6% conversion of propylene and the following selectivities were obtained:

| | Percent |
|---|---|
| Acrolein | 84.0 |
| Acetaldehyde | 3.2 |

What is claimed is:

1. A process for the production of acrolein or methacrolein which comprises contacting, at a temperature substantially from 300 to 600° C., propylene or isobutylene in the vapor phase with oxygen or an oxygen-containing gas in the presence of a catalyst composition consisting essentially of (a) bismuth antimonate expressed by the formula BiSbO₄ and (b) at least one member selected from the molybdates expressed by the formulae: MnMoO₄, Fe₂(MoO₄)₃, CoMo₃O₁₀, wherein the ratio by weight of (a) to (b) is within the range of 95:5 to 20:80.

2. A process for the production of acrolein or methacrolein as claimed in claim 1, wherein a mol ratio of said oxygen to said propylene or isobutylene is 0.8 to 3.0 times.

3. A process for the production of acrolein or methacrolein as claimed in claim 1, wherein said propylene or isobutylene is contacted with said oxygen or oxygen-containing gas together with a diluent gas selected from the group consisting of steam, nitrogen gas and carbon dioxide gas.

4. A process for the production of acrolein or methacrolein as claimed in claim 1, wherein said propylene or isobutylene is contacted with said oxygen or oxygen-containing gas for a period of 0.5 to 40 seconds.

References Cited

UNITED STATES PATENTS

| 3,629,317 | 12/1971 | Yamada et al. | 260—604 R |
| 3,338,952 | 8/1967 | Callahan et al. | 260—604 R |

FOREIGN PATENTS

| 23,925 | 10/1968 | Japan | 260—604 R |

HOWARD T. MARS, Primary Examiner

J. H. REAMER, Assistant Examiner

U.S. Cl. X.R.

252—467, 470